(12) United States Patent
Voutour

(10) Patent No.: US 8,671,070 B1
(45) Date of Patent: Mar. 11, 2014

(54) SYSTEMS AND METHODS FOR EXTRACTING FINANCIAL INFORMATION FROM CONTENT

(75) Inventor: Teddy Joseph Edmund Voutour, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 851 days.

(21) Appl. No.: 12/397,910

(22) Filed: Mar. 4, 2009

(51) Int. Cl.
*G06Q 40/00* (2012.01)

(52) U.S. Cl.
USPC .................................. 707/5; 705/37; 709/206

(58) Field of Classification Search
USPC ......................................... 705/35, 36 R, 37, 5
See application file for complete search history.

(56) References Cited

U.S. PATENT DOCUMENTS

| | | | |
|---|---|---|---|
| 7,136,898 B1* | 11/2006 | Chisaki et al. | 709/206 |
| 7,251,665 B1 | 7/2007 | Dunning et al. | |
| 2002/0004736 A1 | 1/2002 | Roundtree et al. | |
| 2003/0130835 A1 | 7/2003 | Azzam et al. | |
| 2005/0256797 A1* | 11/2005 | Tyulyaev | 705/37 |
| 2008/0133510 A1* | 6/2008 | Timmons | 707/5 |
| 2009/0106140 A1* | 4/2009 | De La Motte | 705/37 |

OTHER PUBLICATIONS

Manber, Udi et al.: "Experience with Personalization on Yahoo!", The Business of Personalization, Communication of the ACM, Aug. 2000, vol. 43, No. 8, pp. 35-39.
Katz, Boris et al.: "Information Access Using Natural Language", Artificial Intelligence Laboratory, http://www.ai.mit.edu, pp. 1-2.

* cited by examiner

*Primary Examiner* — Charles Kyle
*Assistant Examiner* — Siegfried E Chencinski
(74) *Attorney, Agent, or Firm* — Brooks, Cameron & Huebsch, PLLC

(57) ABSTRACT

In one example, when a user reads content on a web browser, the content may contain information about companies, and may suggest, to the user, various financial transactions to be performed with respect to those companies. For example, the user may want to react to financial news about a company by buying or selling stock in the company. A software component (e.g., a browser plug-in) may be used to evaluate content that the user is reading, and to display a user interface that allows the user to perform financial transactions based on the content. For example, if the user reads a news article about a company, the software component may display an interface that shows the ticker symbol of the company's stock and allows the user to initiate a transaction to buy or sell that stock.

14 Claims, 4 Drawing Sheets

SYSTEMS AND METHODS FOR EXTRACTING FINANCIAL INFORMATION FROM CONTENT

BACKGROUND

Many tasks that were traditionally done by other mechanisms have been migrated to computers. For example, people now typically read news on a web browser or other content readers, whereas in the past they would have read print newspapers or magazines. Also, many financial transactions are now performed on web browsers or other types of programs, whereas in the past such transactions involved telephone calls or in-person visits to financial institutions such as banks or stock brokerages. Computers have also engendered some tasks that have no clear analog in the pre-computer world—e.g., reading and posting to blogs.

The migration of news, finance, and other fields of endeavor to computers allows tasks related to these areas to be performed in one place. Moreover, using a computer to perform various different kinds of tasks allows synergy between the tasks. For example, a news article might inspire a financial transaction, and performing the tasks of news-reading and financial transactions together on a computer allows a person to switch from one task to the other at close to the speed of thought. However, due to the lack of effective tools, many opportunities to use the synergies that result from performing different tasks on a computer have not been realized.

SUMMARY

Many types of content—e.g., news, blogs, etc.—may contain information that is related to finance. A person may wish to take action based on the financial information contained in the content. A tool may be provided that extracts certain types of financial information from content, and presents an interface to allow the person to take action.

For example, a person might use a web browser to read an article about energy. The article might contain positive or negative news about a particular oil company, and the person might want to act on that news by buying, selling, shorting, etc., stock in the company. The tool may be used to extract from the article the name of the company. The tool may then identify financial instruments associated with that company (e.g., stocks, bonds, etc.). The person who is reading the article may have an account open with a financial institution (e.g., an on-line brokerage) through which financial instruments may be traded, and the tool may be aware of this account. The tool may then act as an interface to the person's account by offering a user interface (UI) through which the person can trade the financial instruments that the tool has identified.

In one example, the tool may take the form of a browser plug-in or control. The tool may be installed to work with a particular browser, and may evaluate content that is accessed through the browser. When the tool identifies the name of a company or some other type of information that suggests an opportunity for a financial transaction, the tool may present to the user some type of user interface (UI) element that identifies one or more financial instruments and offers the user the chance to trade the instruments.

This summary section is provided to introduce a selection of concepts in a simplified form that are further described in the detailed description section. This summary section is not intended to identify key features or essential features of the claimed subject matter, nor is it intended to be used to limit the scope of the claimed subject matter.

DETAILED DESCRIPTION

When people access content with their computers (e.g., by reading news articles, blogs, etc.), that content may suggest action that the person may wish to take with their investment portfolio. For example, a news article may suggest the rising or falling fortunes of an oil company, an automobile company, a computer company, etc. The person who is reading the article may wish to buy or sell investments based on the news. An article suggesting that a company's business prospects are about to increase (or decrease) may suggest a reason to buy (or to sell) that company's stock. Or, an upgrade (or downgrade) in the company's credit rating may suggest a reason to buy (or to sell) the company's bonds. Any type of news could have financial or economic consequences, so any type of news might suggest reasons for a person to engage in financial transactions to adjust his or her financial positions.

Many sources of information (e.g., news, blogs, discussion groups, analysts' reports, etc.) may be accessed through a computer. Also, various types of financial transactions (e.g., buying or selling of stocks and bonds, banking deposits or withdrawals, etc.) may be performed through a computer. However, existing tools often fail to link the acquisition of information with the performance of a transaction. If a person is reading the web site of a financial magazine and reads something that suggests a reason to buy a certain stock, the person typically has to open a new browser window or tab, navigate to a financial institution's web site, identify the stock involved, and place an order for the stock.

The subject matter herein may be used to facilitate the use of information to perform financial transactions. A tool may be provided that evaluates content that a person is reading, and then provides a UI that allows the person to perform financial transactions related to the content. In one example, the tool takes the form of a browser plug-in or control, although the tool could take any form. The tool may include a component that extracts information from the content. For example, the tool might look for names of companies in the content, and then may look up the stock ticker symbols associated with those companies. The tool may then present the ticker symbol of the identified companies as part of a UI that allows a person to engage in transactions involving the stocks represented by those ticker symbols.

Extraction of information from documents could take various forms. In one example, the tool may perform a word search for names of companies that appear in the content (e.g., "Intel", "Exxon", etc.). In another example, the tool may attempt to extract information based on more complex rules. For example, using a knowledge base, a sophisticated extraction system might be able to infer that the phrase "largest petroleum company based in the Netherlands" refers to "Royal Dutch Shell," even if the name "Shell" is never stated in the document.

Figure 1:
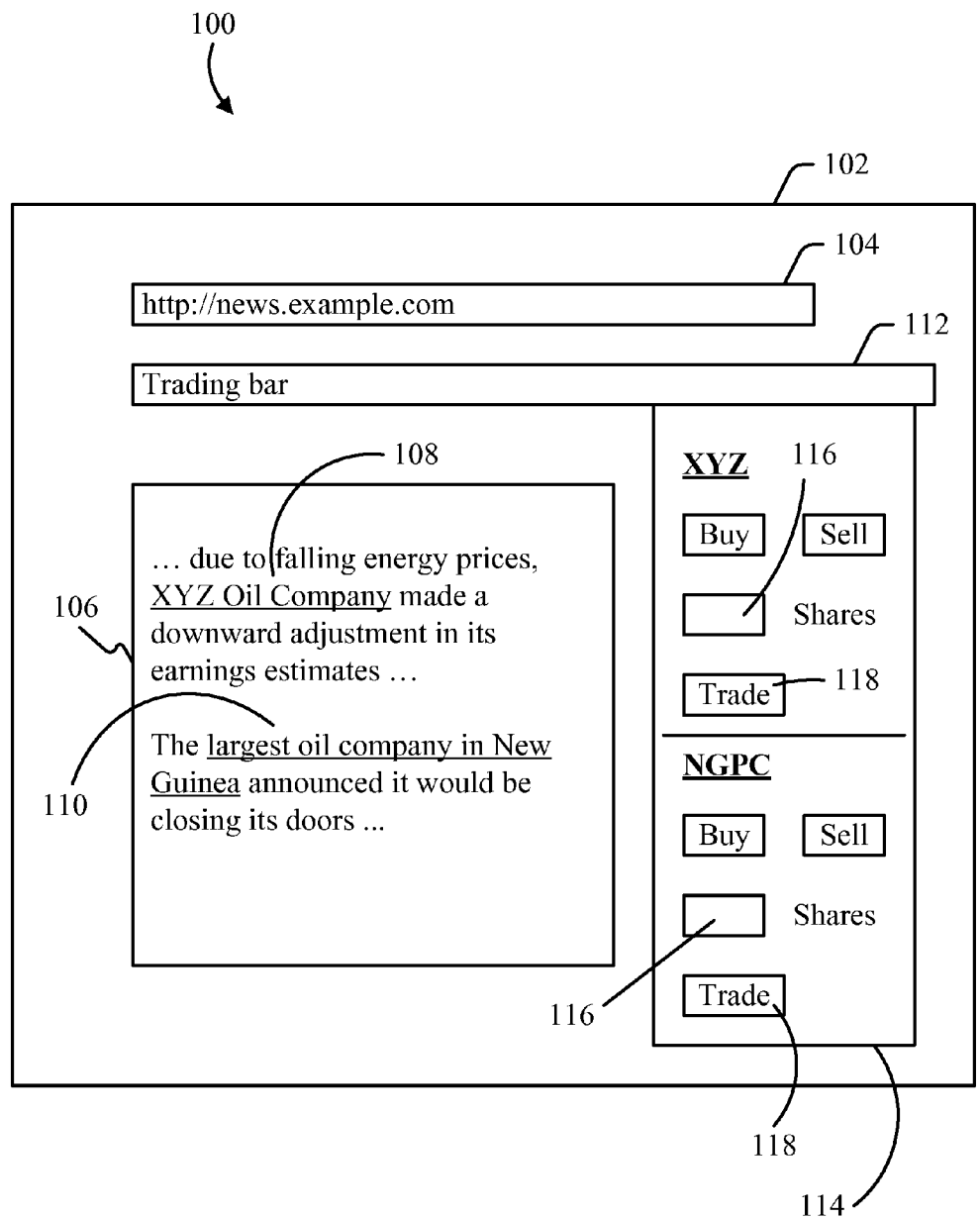
FIG. 1 is a block diagram of an example user interface that shows aspects of the subject matter described herein.

Turning now to the drawings, FIG. 1 shows an example user interface 100, which illustrates aspects of the subject matter that is described herein. User interface 100, in this example, takes the form of a window in which web browser 102 executes. Browser 102 includes a navigation bar 104, which indicates the Uniform Resource Locator (URL) of a web page to be displayed. In the example of FIG. 1, navigation bar 104 shows the URL of an example news web site named news.example.com, although any URL could appear in navigation bar 104.

The web site referenced by that URL contains some form of content. In this example, the content is news content 106, which may be displayed by browser 102. News content 106 may include text, which may reference various companies. In one example, a reference to a company is made explicitly by name: The "XYZ Oil Company" (item 108) is explicitly mentioned in the text. In another example, a reference to a company may be made implicitly: The phrase "the largest oil company in New Guinea" (item 110) may refer to a specific company, although this phrase does not explicitly identify the company by name.

Browser 102 may be software that is extensible. For example, some browsers (e.g., the MOZILLA FIREFOX browsers) are extensible through "plug-ins." Other types of browsers (e.g., the MICROSOFT INTERNET EXPLORER browsers) are extensible through ActiveX controls. Any appropriate component may be used to extend a browser, although the type of component to be used may depend on the type of browser to be extended. For the purpose of illustration, it will be assumed that browser 102 is extensible through plug-ins, although the subject matter herein encompasses any type of browser, and any type of components that might be used to extend that browser's functionality.

One example of a plug-in that may be added to browser 102 is a trading plug-in. For purpose of illustration, the trading plug-in is shown as a visible toolbar 112, although the trading plug-in might operate behind the scenes in browser 102 without manifesting itself as a visible toolbar.

Regardless of the visible form that the trading plug-in might take, the trading plug-in may evaluate web content that has been accessed by browser 102, and may suggest transactions to be performed based on that content. For example, the plug-in may contain the functionality to evaluate content 106 in order to identify companies that are mentioned in that content. With reference to the specific content 106 that is shown in FIG. 1, the plug-in may have the functionality to identify a phrase such as "XYZ oil company" (item 108) as the name of a company. Depending on the level of sophistication of the plug-in, it may also be able to infer names of companies form more oblique phrases. For example, if the largest oil company in New Guinea is the "New Guinea Petroleum Company," the plug-in may have the functionality to identify the phrase "largest oil company in New Guinea" as referring to this company, even though the name of the company is not explicitly stated.

When the plug-in detects information that could be used to suggest a financial transaction (e.g., the name of a company in which a user might want to buy stock), the plug-in may display a user interface element 114, which offers a user the chance to perform a financial transaction. For example, user interface element 114 may offer a user the chance to buy and/or sell stock in XYZ company and the New Guinea Petroleum Company. User interface element 114 may identify these companies by their ticker symbols (XYZ and NGPC, respectively). It may also provide elements through which a user may enter the number of shares to be bought and/or sold (elements 116), and buttons 118 through which a user may initiate a transaction. The buying or selling of stock is an example of a financial transaction that the plug-in may facilitate, although the plug-in could facilitate other types of financial transactions. For example, if a bank is named in an article, the plug-in could display a user interface that allows a user to deposit into, and/or withdraw money from, the named bank. Or, if the company identified by the plug-in borrows money through credit markets, then plug-in could offer the user the chance to buy and/or sell bonds and/or commercial paper issued by the company. Any type of financial transaction could be proposed and/or facilitated by the plug-in.

While FIG. 1 shows an example web browser with a plug-in toolbar, the subject matter herein could be implemented in any form and is not limited to this example.

Figure 2:
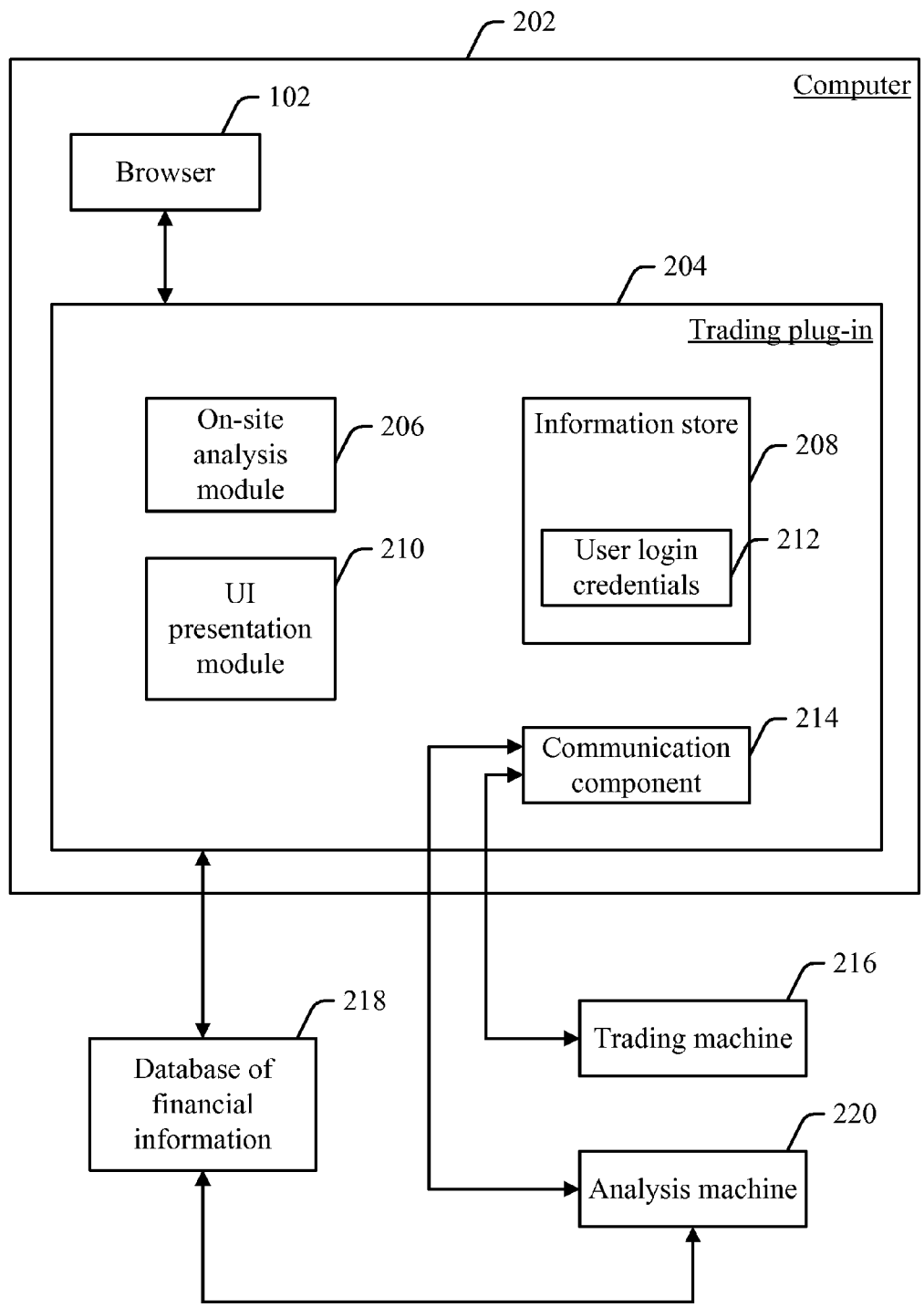
FIG. 2 is a block diagram of example components that may be used to facilitate financial transactions based on content.

FIG. 2 shows example components that may be used to facilitate financial transactions based on content.

Browser 102 is a program that executes on computer 202. Browser 102 may be any type of browser although, in the example of FIG. 2, browser 102 is one that is extensible by way of plug-ins. One example of a plug-in that is used to extend the functionality of browser 102 is trading plug-in 204. Trading plug-in 204, in turn, may include various sub-components that implement various parts of its functionality.

One example sub-component of trading component 204 is on-site analysis module 206. On-site analysis module 206 evaluates content that is accessed by browser 102 (e.g., web pages that browser 102 has retrieved from specific URLs), and identifies information from which financial transactions may be suggested. For example, on-site analysis module 206 may identify the names of specific companies mentioned in a piece of content, so that trading plug-in 204 may suggest trading stock in those companies. On-site analysis module 206 is "on-site" in the sense that it performs analysis on the same machine as browser 102 is running (computer 202). As described subsequently, on-site analysis module 206 may be assisted by an analysis machine 220 that is located at a place other than at computer 202 (e.g., analysis machine may be a remote server that is accessed through a network). Any analysis task may be performed by on-site analysis module 206, or by an analysis machine located elsewhere, or by any combination of these components.

Trading plug-in 204 may comprise, or otherwise may make use of, information store 208. For example, information store 208 may contain names of common companies (and, possibly, their ticker symbols), so that analysis module 206 may identify these companies when their names appear in content. (As another example, trading plug-in 204 may communicate with a remote database 218 of financial information, and may identify company names, ticker symbols, etc., by communicating with this remote database.)

User-interface (UI) presentation module 210 may be used by trading plug-in 204 in order to present a user-interface that offers a user the chance to perform financial transactions. For example, UI element 114 (shown in FIG. 1) may be generated and/or presented to a user by UI presentation module 210. UI presentation module might present a UI in the form of a pop-up window, a dialog box, a drop-down menu, or any other form.

User login credentials 212 are the credentials (e.g., username and password combination, or some other type of credential) that may be used by trading plug-in 204 to log into a server where financial transactions may be performed. In one example, trading plug-in 204 facilitates financial transactions by suggesting transactions to perform, where the actual transactions may be performed on a machine (e.g., trading machine 216) with which a user has an account. For example, trading plug-in 204 may suggest to the user that he or she buy or sell shares of XYZ company, but the actual trade—if the user chooses to make that trade—may be performed by a trading web site with which a user has an account. Although the user may be able to use the UI element presented by trading plug-in 204 in order to specify that he or she wants to perform the trade (e.g., by clicking one of buttons 118, shown in FIG. 1), if the user so indicates then trading plug-in 204 may act as a sort of client that acts on behalf of the user to perform the trade with the trading web site with which the user has an account. In this case, trading plug-in 204 presents the user's login credentials 212 to the trading web site and performs the trade that the user has requested. Login-credentials 212 may be stored in information store 208 (as shown in the example of FIG. 2), although login credentials 212 could be stored in any manner.

Trading plug-in 204 may also include a communication component 214. As shown in FIG. 2, trading plug-in may communicate with various remote entities, such as trading machine 216 and analysis machine 220. Communication component 214 may be used to facilitate communication between trading plug-in 214 and these remote entities.

As previously noted, some or all of the content analysis that trading plug-in 204 provides may be performed by analysis machine 220, which may be remote from the computer 202 on which trading plug-in 204 operates. For example, certain types of analysis (e.g., sophisticated feature extraction techniques) may involve more computational effort, or access to more data, than would be available on computer 202. For this reason (or for any other reason), trading plug-in 204 may consult with analysis machine 220 in order to perform some of the analysis of content that has been accessed through a web browser. Trading plug-in 204 may communicate with analysis machine through communication component 214, and through a network (such as the Internet). Analysis machine 220 may, for example, be a server computer, although analysis machine 220 could be any type of machine.

Database 218 may contain a corpus of information that may be used (e.g., by on-site analysis module 206, or by analysis machine 220) to analyze content that has been accessed with a web browser.

Figure 3:
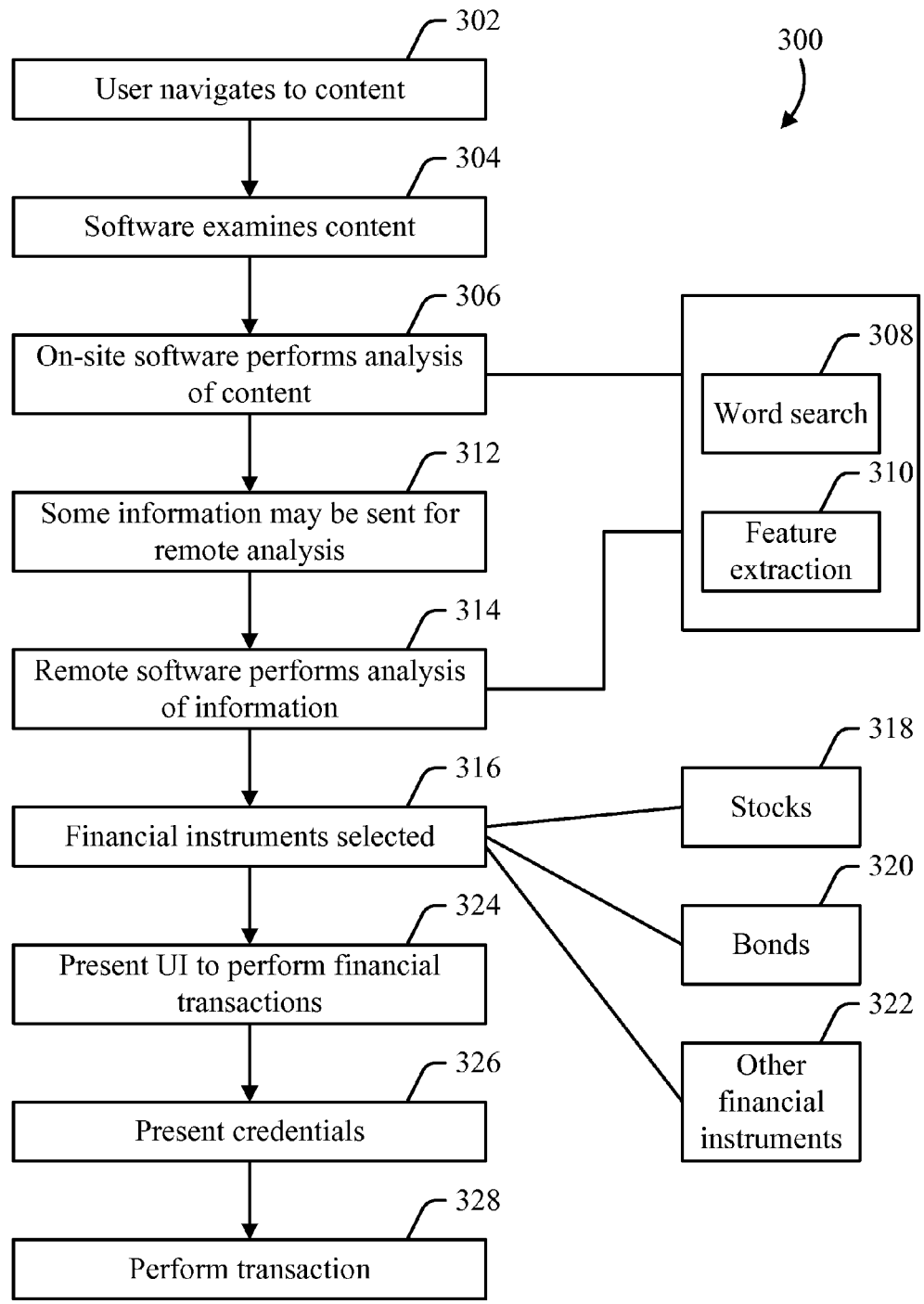
FIG. 3 is a flow diagram of an example process in which content may be analyzed, and in which transactions based on the content may be proposed and/or facilitated.

FIG. 3 shows an example process 300 in which content may be analyzed, and in which transactions based on the content may be proposed and/or facilitated. Before turning to a description of FIG. 3, it is noted that FIG. 3 is described, by way of example, with reference to components shown in FIGS. 1 and 2, although these processes may be carried out in any system and are not limited to any particular scenario. Additionally, the flow diagram of FIG. 3 shows an example in which stages of a process are carried out in a particular order, as indicated by the lines connecting the blocks, but the various stages shown may be performed in any order, or in any combination or sub-combination.

At 302, a user navigates to content. For example, a user might type a URL into a navigation bar, or retrieve a bookmarked page, etc. Content could be navigated to in any manner. An example type of content to which a user might navigate is a news web site that contains financial news, although the user could navigate to any type of content.

At 304, software (e.g., trading plug-in 204, shown in FIG. 2) examines the content. At 306, an analysis of the content may be performed by on-site software. For example, on-site module 206 (which is an example of such on-site software) may analyze the content. Various types of analysis may be performed. One type of analysis is a word search 308. For example, a search may be performed to determine whether the names of particular companies appear in the content. Another type of analysis that may be performed is feature extraction 310. For example, sophisticated feature extraction techniques that attempt to derive meaning from the context of certain words may be used to extract information from the document, when such information cannot be extracted by simple word analysis.

As previously noted, some or all of the analysis of content may be performed by a remote component, such as analysis machine 220 (shown in FIG. 2). Thus, at 312, some information that is obtained or derived from the content to be analyzed may be sent to a remote component for analysis. At 314, software present at that remote component may perform analysis of the information that has been sent to it. Like the analysis that may have been performed by an on-site component, the analysis performed by the remote component may, for example, include word search 308 and/or feature extraction 310.

At 316, one or more financial instruments are selected based on the analysis that has been performed by on-site software and/or by a remote component. Any types of financial instruments could be selected—e.g., stocks 318, bonds 320, or any other type of financial instrument (at 322). The particular instruments selected may depend on the content being analyzed. For example, if the content contains the names of companies, then various types of securities (e.g., common stock, preferred stock, options, warrants, etc.) may be selected. If the content contains the name of a bank, then either stock in the bank, or instruments issued by the bank (e.g., certificates of deposit) could be selected. If the content contains the names of companies that issue debt instruments, then the financial instruments selected might include the stock of those companies as well as bonds issued by those companies. In general, the financial instruments selected could be any type of instruments that are appropriately suggested by the content being analyzed.

At 324, a UI element is presented to a user that would allow the user to perform financial transactions involving the selected instruments. For example, if stocks are selected, then the UI element may present the ticker symbols of the stocks and offer the user the chance to buy or to sell shares of those stocks. If the financial instruments are bank deposits, then the UI element might offer the user a chance to make a deposit or withdrawal. User interface element 114 (shown in FIG. 1) is an example of a UI element that could be presented to a user to allow the user to trade stocks.

As previously noted, the software that presents the UI may act as a type of client that performs transactions with a server on behalf of a user. For example, the UI might allow the user to request a stock trade through a trading web site with which he or she has an account. Thus, in order to access such a server, the user's login credentials may be presented to that server (at 326). At 328, the transaction requested by the user may be performed.

Figure 4:
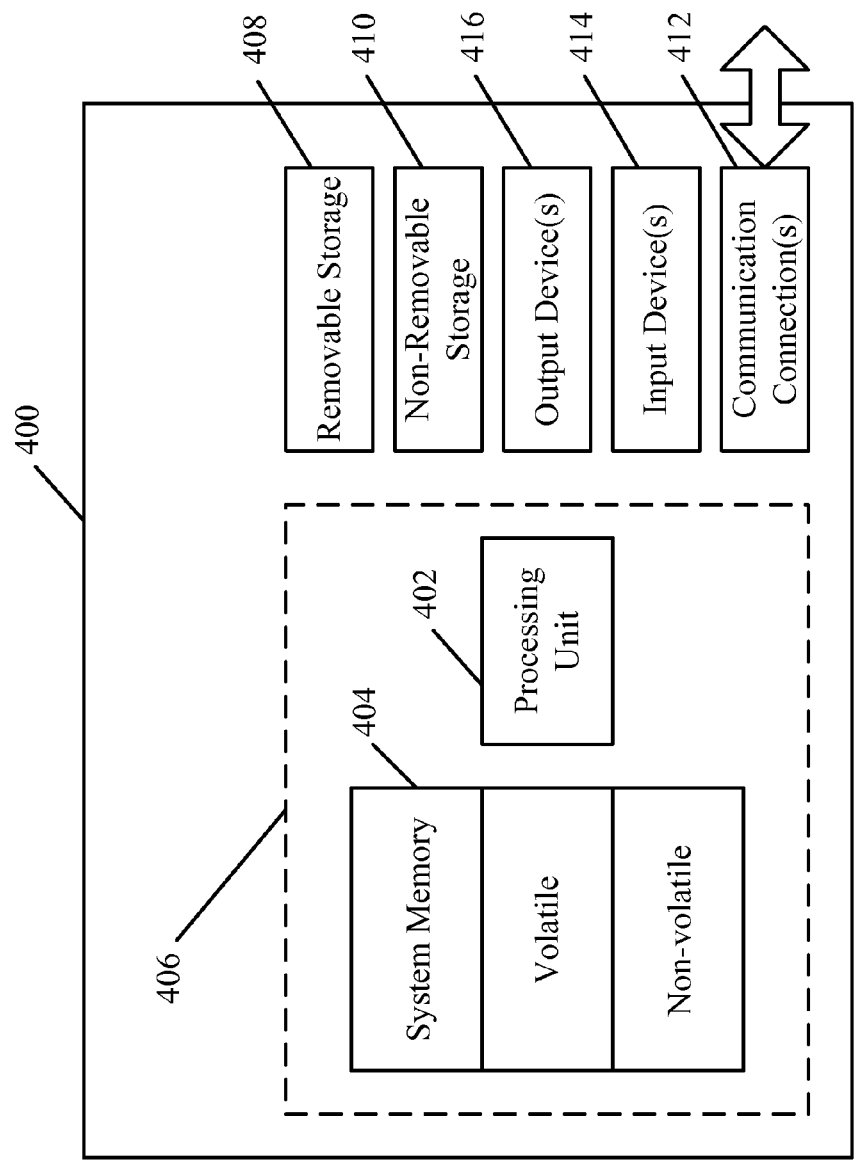
FIG. 4 is a block diagram of an example computing environment that may be used in connection with implementations of the subject matter described herein.

The subject matter described herein may be implemented through the use of a computer system, or other type of device that has some computing mechanism(s). FIG. 4 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an example system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by computing device 400 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 404, removable storage 408, and non-removable storage 410 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may also contain communications connection(s) 412 that allow the device to communicate with other devices. Communications connection(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 400 may also have input device(s) 414 such as keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system including computer-readable instructions stored on a non-transitory computer-readable storage medium and executed by a computer for facilitating performance of a financial transaction, the system comprising:
   at least one subsystem that examines content that a user has accessed through a user interface, wherein the content is displayed to the user through the user interface;
   at least one subsystem that analyzes said content to identify a company to which said content refers and to identify an account of the user to perform a financial transaction involving a financial instrument associated with said company;

at least one subsystem that selects the financial instrument associated with said company based on an examination of the content that identifies the company to which said content refers and based on the analysis that identifies the account of the user to perform the financial transaction involving the financial instrument associated with said company; and at least one subsystem that presents a user interface element through the user interface that offers said user a chance to perform the financial transaction involving the selected financial instrument.

2. The system of claim 1, further comprising:

at least one subsystem that consults with an analysis machine to perform at least some analysis of said content; and at least one subsystem that uses results provided by said analysis machine to select said financial instrument.

3. The system of claim 1, further comprising:

at least one subsystem that retrieves, from a store, login credentials that said user uses to access a server on which transactions are performed; and at least one subsystem that provides said credentials to said server in order to perform said financial transaction on behalf of said user.

4. The system of claim 1, further comprising:

at least one subsystem that selects a stock of said company as said financial instrument.

5. The system of claim 1, wherein said company issues debt instruments, and wherein the system further comprises:

at least one subsystem that selects a bond issued by said company as said financial instrument.

6. The system of claim 1, wherein said financial transaction comprises buying or selling said financial instrument, and wherein the system further comprises:

at least one subsystem that offers said user a chance to buy or to sell said financial instrument.

7. The system of claim 1, wherein said company comprises a bank, wherein said financial transaction comprises depositing in, or withdrawing money from, said bank, and wherein the system further comprises:

at least one subsystem that offers said user a chance to deposit or to withdraw money in said bank.

8. A non-transitory computer-readable storage medium comprising computer-readable instructions for facilitating a financial transaction, the computer-readable instructions comprising instructions that, when executed by a computer:

receive, from a computer on which a user has accessed and viewed content through a user interface, data indicative of said content;

analyze said content to identify a company that is referred to in said content and to identify an account of the user to perform a financial transaction involving a financial instrument associated with said company;

select the financial instrument associated with said company based on an examination of the content that identifies the company to which said content refers and based on the analysis that identifies the account of the user to perform the financial transaction involving the financial instrument associated with said company; and use a network to send an indication of the financial instrument to said computer with an indication of the financial transaction to be performed by the user through the user interface with respect to the selected financial instrument.

9. The non-transitory computer-readable storage medium of claim 8, wherein said company is referred to by name in said content, and wherein the computer-readable instructions further comprises instructions that:

access a database to identify names of companies; and perform a word search on said content to determine that said content includes a name of said company.

10. The non-transitory computer-readable storage medium of claim 8, wherein said company is not referred to by name in said content, and wherein the computer-readable instructions further comprises instructions that:

perform feature extraction on said content to infer that said content refers to said company.

11. The non-transitory computer-readable storage medium of claim 8, further comprising instructions that:

identify a stock associated with said company, said stock being said financial instrument; and provide a ticker symbol of said stock.

12. The non-transitory computer-readable storage medium of claim 8, further comprising instructions that:

determine that said company issues debt instruments; and identify a bond associated with said company, said financial instrument being said bond.

13. The non-transitory computer-readable storage medium of claim 8, further comprising instructions that:

determine that said company is a bank; and identify a deposit instrument offered by said bank, said financial instrument being said deposit instrument.

14. The non-transitory computer-readable storage medium of claim 8, further comprising instructions that:

retrieve, from a database, logon credentials that are usable to perform said transaction on behalf of said user.

* * * * *